Patented May 1, 1951

2,550,997

UNITED STATES PATENT OFFICE 2,550,997

INHIBITION OF CORROSION

Gail D. Harden, East Chicago, Ind., and William J. Curry, Lynbrook, N. Y., assignors to Shell Development Company, San Francisco, Calif., a corporation of Delaware No Drawing. Application February 14, 1949, Serial No. 76,428

3 Claims. (Cl. 148—6.14)

The present invention relates to a method of inhibiting corrosion and more particularly to a method for inhibiting corrosion of cargo tanks of aquatic vessels engaged in transporting liquid cargoes.

At the present time there is a tremendous problem present in that part of the shipping industry which concerns itself with the water transportation of liquid cargoes. Great expense is incurred annually for the upkeep and repair of metal bulkheads, structural members, etc., of ships (which bulkheads and members are usually made of a ferruginous metal, such as steel), which have been severely corroded, and much time and revenue are lost by the necessity for frequently taking ships out of service for overhaul and repair of damages due to such corrosion.

This corrosion may be due to various causes, and very often a combination of several causes. For instance, the liquid itself being transported may be corrosive to steel, or other ferruginous metals; or, as is usually the case, small amounts of water may be present dissolved or dispersed as an impurity within the liquid cargo, or as a distinct phase having separated from the cargo or atmosphere due to changes in temperature. This latter situation is particularly troublesome in the transportation of refined petroleum products, such as gasolines, kerosenes, various specialty products, and the like.

Another very cogent cause of corrosion stems from the requirement of shippers that cargo tanks be thoroughly cleansed of all previously carried cargo before taking on a new product. Many ships regularly operate on a schedule under which cargoes are carried only one way on a round trip, and these ships conserve time by carrying out the cleansing operations while under way without a cargo. In oil tankers, for instance, the cleansing is termed "butterworthing," and generally consists of spraying sea water at about 180° F. and 170 p. s. i. against the inner walls of the tanks for about 1½ hours in each tank. The combined rinsing and scouring effect of the high velocity hot liquid stream knocks any residual liquid products and loose scale from the bulkheads, etc. The mixture of salt water and residual product is pumped overboard, and men go into the tanks for the further removal by hand of rust and scale. Heating of the sea water has been considered necessary for proper cleansing action, and effective purging of the vapors resulting from the liquid cargo, the latter so that men may safely enter the space.

Thus, it can readily be seen that such tanks are repeatedly exposed to a highly corrosion-promoting cycle consisting of 1—exposure to a corrosive cargo (usually including water), 2—exposure to the atmosphere, 3—exposure to hot salt water solution, and 4—exposure to the atmosphere. It should be pointed out that because of the relatively high humidity of air over bodies of water the exposure to the atmosphere is itself an abnormally corrosive step. It should also be noted that whereas it has been well recognized that the use of sea water as a cleansing agent promoted considerable corrosion, it has been deemed necessary because of the scarcity and resulting high value of fresh water aboard ocean-going vessels.

Accordingly, it is an object of this invention to provide a method of increasing the life and efficiency of cargo carrying aquatic vessels by inhibiting and materially reducing the normal corrosion of the cargo tanks of such vessels. Another object is to reduce the number of man-hours required aboard liquid cargo carrying ships to clean tanks in preparation for future cargo. Further objects are to provide a non-corrosive method for cleansing such tanks, and one which markedly reduces the normal corrosion rates normally occurring in tanks aboard such vessels. Additional objects will become evident from the following description of the present invention.

It has now been found that the above and other objects may be attained by treating cargo tanks of aquatic vessels with an alkaline fresh water solution of a soluble inorganic nitrite salt. This method of treating tanks has been found to be particularly useful when employed as a means for removing residual amounts of cargoes from such tanks, and particularly advantageous if utilized in such a manner as to recover and re-use the treating solution.

The surprising effectiveness of the present invention is illustrated by reference to the following results of various tests made in an attempt to solve the present problem. The tests consisted of substituting various treating solutions for the hot sea water normally used in the butterworthing process. In every case, the tests were continued for at least nine complete cycles, or round trips, of a tanker transporting refined petroleum products as cargo.

|   | Treating Solution | Results |
|---|---|---|
| 1 | Hot sea water (180° F.) (normal practice). | Very heavy corrosion. |
| 2 | Cold sea water (80° F.) | Very slight reduction in corrosion. |
| 3 | Cold fresh water (ambient temp.). | Slight improvement over (2), above. |
| 4 | Cold fresh water+2% of $NaNO_2$+NaOH. | Essentially complete corrosion inhibition throughout entire nine cycles. |

From the above table it is seen that, while solutions 2 and 3 showed only a very slight improvement over the usually used hot salt water (due to the use of slightly less corrosive cleansing liquids), the alkaline fresh water solution of sodium nitrite afforded effective protection against corrosion by water, atmosphere, and corrosive cargo. The importance of the presence of both alkalinity and nitrite ion is emphasized by the fact that the use of sodium nitrite solutions in sea water or in fresh water will show little improvement over plain sea water or pure fresh water in reducing corrosion.

The above illustration is not to be construed as limiting the instant invention to the particular nitrite salt and alkaline agent used therein. Thus, any inorganic, water-soluble nitrite salt may be used which will give a sufficiently high concentration of nitrite ion in the treating solution. Sodium nitrite is preferred because of its low cost and ready availability, but other nitrites such as $KNO_2$, $NH_4NO_2$, $LiNO_2$, $CeNO_2$, $Ca(NO_2)_2$, $Ba(NO_2)_2$, $Sr(NO_2)_2$, and the like, may also be used, if desired. It is obvious that other factors will also influence the choice of a particular nitrite. For instance, $Ca(NO_2)_2$ will probably not be used if the solvent water has a high carbonate or bicarbonate ion concentration, because of resulting precipitate of $CaCO_3$. The solubility of the salt in cold water will also be an important factor, particularly where relatively high concentrations of nitrite ion are desired. The desired nitrite ion concentration will vary, depending on such factors as the severity of corrosive tendencies, the composition of the fresh water used, and the time which can be allowed for treating the tanks. Consequently, the most effective economical concentration cannot be stated for all applications. In general, however, concentrations between about 0.003% and about 10%, and preferably from about 0.1% to about 5%, by weight of nitrite ion, may be used.

As stated hereinbefore, and emphasized by the foregoing illustrations, in order to be effective the nitrite salt must be in an alkaline solution, a pH of from about 8 to about 12, being particularly advantageous. Any of the well-known methods for obtaining or controlling alkalinity may be used, e. g., by the addition of alkaline metal oxides and hydroxides, including ammonia, such as $CaO$, $KOH$, $NaOH$, $NH_4OH$, and the like, or the addition of salts of strong bases and weak acids, such as $Na_2CO_3$, $K_3PO_4$, $Na_2B_4O_7$, $NaC_2H_3O_2$ etc.

The precise mechanism by means of which this surprising inhibition takes place is not understood, but it has been found to be adversely affected by sea water. Consequently, best results are obtained by the use of fresh water solutions. The term "fresh water," as used herein, is intended to embrace that type of water (as distinguished from sea water, or salt water) which is obtained from normal inland sources, such as springs, wells, rivers, lakes, etc., as well as rain water, and which contains a relatively low concentration of dissolved salts (as compared to the concentrations of said salts in sea water). It is also intended to include distilled water and water demineralized by an ion exchange material. By the term "alkaline fresh water solutions of a nitrite salt," and terms of similar import, are meant water solutions containing only the nitrite salt, the alkaline agent, the small amounts of mineral and other salts, and impurities, which may be normally associated with fresh water, and any additional material which does not adversely affect the corrosion-inhibiting action of the alkaline nitrite solution.

Because of the above-mentioned adverse effect of sea water, cargo tanks which are ballasted with sea water on return trips are not so effectively protected by the practice of this invention. The ballasted tanks may be protected by some other method of inhibition, as, for example, by the use of magnesium anodes as described in the British Patent No. 581,341, issued October 9, 1946.

In one respect, the simplest application of this invention would be to merely substitute the present nitrite solutions for the hot sea water now used in "butterworthing." However, 1—most vessels are not able to carry sufficient fresh water to discard the solution pumped from the cargo tanks, and 2—the cost of nitrite salt and alkaline agent would be excessively high. These disadvantages have been overcome by a preferred method of practicing this invention. According to this preferred embodiment, the alkaline nitrite solution (in fresh water) is mixed in any tank, and suction is taken on the solution by a pump which delivers the solution to the butterworthing, or like, nozzles. After being sprayed on the inside of the cargo tanks the solution collects in the bottom of the tank along with any residual product which has been washed from the walls. Another pump takes suction on the used solution in the bottom of the cargo tank and, instead of pumping it overboard, returns it to the original tank in which the solution was mixed. The nitrite solution and residual products separate by settling, the residual products being pumped overboard and the nitrite solution reused. Thus, it is readily seen that the total amount of fresh water required will be dependent upon the rate at which the solution is pumped and the time required for settling. Excellent results have been obtained with a total of as little as 200 barrels of fresh water, which can easily be taken aboard at the port of discharge of the cargo.

While it is a relatively simple matter to modify the piping of a vessel so that pumping may be done with permanently installed ship's pumps, the above recirculation or recovery may be accomplished by any other suitable means, such as by portable electric pumps and temporary flexible hose. Likewise, the application of the cleansing and corrosion-inhibiting solution to the tanks containing residual amounts of cargo may be by means other than spraying with butterworthing equipment, as for example, by directing a solid stream into the tank. Also, if desired, the separation of solution and water-insoluble product may be accomplished by means other than settling, and in a place other than the original mixing tank. Such details are ones well-known to those versed in the art, and may be varied to fit the situation at hand. The important aspect is that the fresh water solution be recovered and reused, thus conserving fresh water and making the above-discovered fresh water treatment practical for seagoing vessels While this invention is especially valuable for use aboard ships such as oil tankers, normally used for transporting petroleum products, particularly refined products such as gasoline, fuel oils, etc., it may be used aboard other ships, barges, and the like where severe problems of ferruginous metal corrosion exist. It may also be used for removing residual amounts of products other than petroleum products. If the solution is to be recovered and reused, the residual products should preferably be insoluble in the solution to facilitate a separation.

From the above, it is readily seen that the practice of this invention not only greatly reduces the corrosion of cargo tanks aboard tankers and the like, but also eliminates the necessity for heating large quantities of sea water to 180° F. and the frequent necessity for scraping the insides of cargo tanks. Thus, a saving in manpower and money is realized.

We claim as our invention:

1. An improved corrosion-inhibiting process for cleaning residual amounts of petroleum products from ferruginous metal cargo compartments of oil tankers at sea which comprises spraying the inner walls of said compartments with an alkaline fresh water sodium nitrite solution at ambient temperature, thereby forming a mixture of said solution and said products, withdrawing the mixture from said compartment, allowing said mixture to settle into two phases, separating the products from the solution, and returning said solution to the spraying operation.

2. A corrosion-inhibiting method for removing residual amounts of petroleum products from ferruginous metal tanks of tankers at sea which comprises directing against the inner walls of said tanks an unheated alkaline fresh water solution of a water-soluble inorganic nitrite salt, thereby forming a mixture of said products and said solution, separating the solution from the removed products, and reusing said solution for further washing of said tanks.

3. A corrosion-inhibiting method for removing residual amounts of petroleum products from ferruginous metal tanks of sea-going cargo-carrying aquatic vessels at sea which comprises directing against the inner walls of said tanks an unheated alkaline fresh water solution of a water-soluble inorganic nitrite salt, thereby forming a mixture of said products and said solution, separating the solution from the removed products, and reusing said solution for further washing of said tanks.

GAIL D. HARDEN.
WILLIAM J. CURRY.

REFERENCES CITED

The following references are of record in the file of this patent:

UNITED STATES PATENTS

| Number | Name | Date |
|---|---|---|
| 1,629,486 | Dougherty | May 24, 1927 |
| 1,806,740 | Butterworth | May 26, 1931 |
| 2,236,895 | Court | Apr. 1, 1941 |
| 2,297,666 | Wachter | Sept. 29, 1942 |
| 2,428,364 | Frager | Oct. 7, 1947 |
| 2,443,721 | Butcher, Jr. | June 22, 1948 |

OTHER REFERENCES

A. Wachter and S. S. Smith: Industrial and Engineering Chemistry, March 1943, pages 358 to 367.